H. GREINACHER & C. W. MILLER.
METHOD AND ARRANGEMENT OF APPARATUS FOR THE DETECTION AND MEASUREMENT OF ALTERNATING CURRENTS AND OTHER CURRENTS OF PERIODIC NATURE.
APPLICATION FILED DEC. 2, 1916.
1,287,970. Patented Dec. 17, 1918.
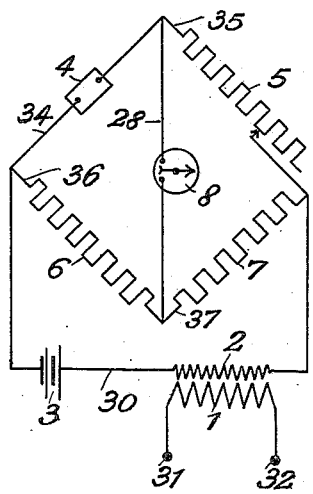
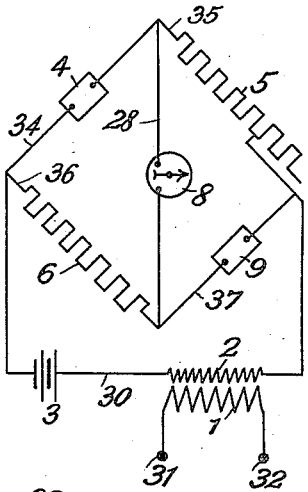
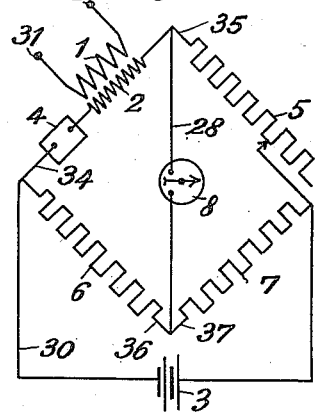
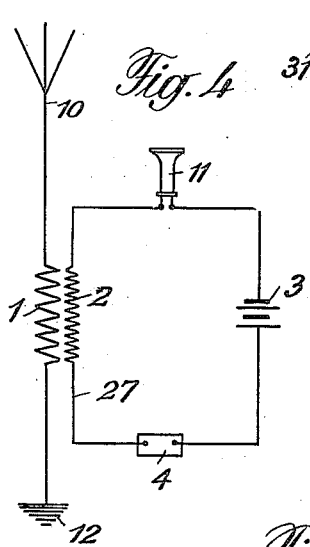
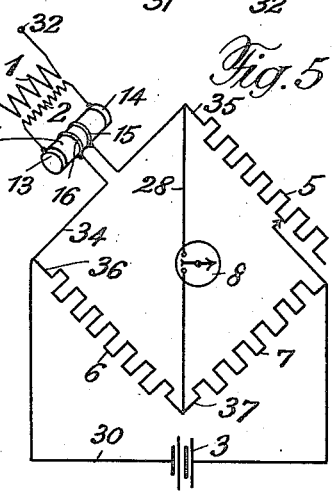
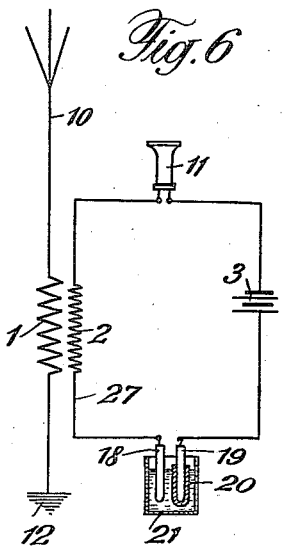
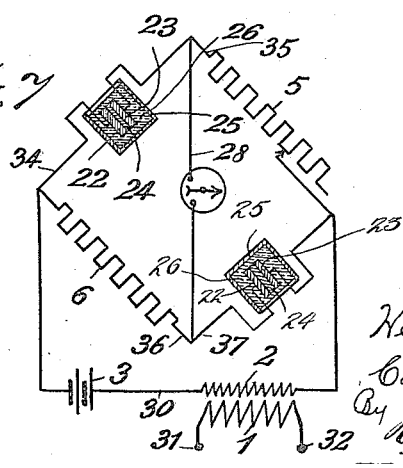
Inventors
Heinrich Greinacher,
Carl W. Miller,
By ........ atty.

UNITED STATES PATENT OFFICE.

HEINRICH GREINACHER, OF ZURICH, SWITZERLAND, AND CARL W. MILLER, OF SOMERVILLE, MASSACHUSETTS.

METHOD AND ARRANGEMENT OF APPARATUS FOR THE DETECTION AND MEASUREMENT OF ALTERNATING CURRENTS AND OTHER CURRENTS OF PERIODIC NATURE.

1,287,970. Specification of Letters Patent. Patented Dec. 17, 1918.

Application filed December 2, 1916. Serial No. 134,702.

*To all whom it may concern:*

Be it known that we, HEINRICH GREINACHER, a citizen of the Republic of Switzerland, residing at Zurich, Switzerland, and CARL W. MILLER, a citizen of the Republic of the United States of America, residing at Somerville, Massachusetts, United States of America, have invented certain new and useful Improvements in Methods and Arrangements of Apparatus for the Detection and Measurement of Alternating Currents and other Currents of Periodic Nature; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

As has been known since 1873, the electrical resistance of selenium is altered by exposure to light. Later on it was discovered that not only light waves, but also electromagnetic waves (for example electric waves, Röntgen rays, and certain radiations from radium) affected the electrical resistance of selenium and, in general substantially decreased it. In order to observe this change in conductivity, an electric current is passed through a selenium cell, and the change in this current is measured when the cell is exposed to light.

It has now been discovered that precisely this same effect which is obtained by exposing the cell to electromagnetic waves is also obtained by applying an alternating "current" directly to the cell itself.

In order to understand this new effect, it is necessary in the next place to note that, in the past, selenium cells have been used with alternating currents, and that with alternating currents a rectifying effect has been observed (conf. Christ. Ries: *"Die Elektrischen Eigenschaften and die Bedeutung des Selens für die Elektrotechnik"*, 1913, 2. Auflage, Seite 61). Formerly, however, this alternating current was used only as a "measuring current", *i. e.* a current, the changing intensity of which might be used to measure the variation in resistance of the cell when exposed to light.

The new effect appears when, in addition to the "measuring current" (in general a direct current), a second current of a different type (*e. g.* an alternating current or a pulsating current) is applied. Then the effect of the second current on the selenium may be measured by the change in intensity of the first. If a direct current is used as the measuring current, and a 50 period alternating current is superposed on it, an increase of the direct current takes place, precisely the same as when the cell is exposed to light.

The accompanying drawings represent diagrammatically several typical arrangements of apparatus for use with the new method for the detection and measurement of alternating currents and other currents of a periodic nature.

Figure 1 shows a first arrangement according to this invention.

Figs. 2 and 3 show two modifications of the arrangement shown in Fig. 1.

Fig. 4 shows another arrangement according to this invention.

Fig. 5 shows a modification of Fig. 3.

Fig. 6 shows a modification of the arrangement according to Fig. 4.

Fig. 7 shows a further modification of the arrangement according to Fig. 1.

The arrangement shown in Fig. 1, which is adapted for observing the change in specific resistance of selenium due merely to the passage of an alternating current to be detected, comprises a selenium cell 4 of the common type placed in the arm 34 of a Wheatstone bridge. In the other arms 35, 36, 37 of this bridge are arranged in the usual manner resistances 5, 6, 7 respectively, the resistance 5 being adjustable. A sensitive galvanometer 8 is put in the cross-connection 28 of the bridge. In the battery circuit 30 is placed the battery 3 for supplying direct current to the arms of the bridge. In the same circuit 30 is also placed a secondary coil 2, which is coupled to a primary coil 1 by means of which a current of periodic nature, for instance an alternating current or the like, may be applied to the bridge and superposed on the direct current. The coils 1 and 2 may be, for example, the winding of a transformer. The coil 1 has two binding terminals 31 and 32 for the connection of a circuit through which is passed a current of periodic nature. When the bridge is so balanced that no current flows through the galvanometer 8, the current of periodic nature to be detected is passed through the primary coil 1 and thus applied to the bridge. The resultant deflection of the galvanometer then shows the change in resistance of the selenium cell merely resulting from the superposed current.

The terminals 31, 32 may, for instance, be connected to a known Wheatstone bridge for alternating current, the coil 1 thus being put in this bridge, for instance for the purpose of detection, that no current passes through it. Instead of measuring and detecting the alternating current by means of a sensitive galvanometer for alternating current, this current can now be detected by the use of the arrangement shown in Fig. 1 with the direct current galvanometer 8, the effect being caused merely by the change of the specific resistance of the selenium.

Other arrangements of apparatus can, of course, be used. For avoiding the troubling influence by the rectifying effect of an alternating current it is advantageous to use two selenium cells and to put into the arm 37 of the Wheatstone bridge the second selenium cell, as has been shown in Fig. 2. In this case the troubling influence by the rectifying effect of the superposed alternating current is avoided.

In Fig. 3 is shown an arrangement whereby the induction coil 2 is placed in series with the selenium element 4 in the arm 34 of the Wheatstone bridge instead of in the battery circuit 30.

Of course, various arrangements of the Wheatstone bridge may be used.

In Fig. 4 another typical arrangement of apparatus is shown, referred to above and involving a simple apparatus for wireless telegraphy. An antenna 10 connected to ground 12 contains the self-induction coil 1 electromagnetically coupled to a coil 2. This coil 2 is in a circuit 27 containing also a selenium cell 4, a direct current battery 3 and a telephone receiver 11. The latter need not be directly in the circuit, but may be, as is customary and known, excited inductively. The electric oscillations from the antenna are transferred by induction and then superposed to the direct current flowing in the circuit 27.

Under the impulse of every train of waves, the specific resistance and thus also the total resistance of the selenium in the selenium cell is changed, and these changes are made audible by the telephone receiver.

The characteristic feature in all these arrangements is that an alternating current is applied to a selenium cell through which already a direct current was flowing. It should be noted, however, that it is not necessary for it to be applied to the same electrodes as the "measuring current", but may be applied altogether or in part at different points of the circuit.

Fig. 5 is, for instance, a modification of the arrangement shown in Fig. 1, the selenium cell being rod-shaped. The direct current of the bridge is applied by means of the inner electrodes 15, 16 while the current to be detected is led to the selenium cell by the outer electrodes 13, 14 connected to the secondary coil 2 electromagnetically coupled to the primary coil 1. Furthermore the arrangement is not limited for detection and measuring of ordinary alternating currents, but is applicable to all currents, which are not constant (rectified alternating currents, oscillating and intermittent direct currents).

Fig. 6 shows that the place of the selenium cell may also be taken by a "selenium element 21", i. e. an electrode 19 coated with selenium 20 and a metal electrode 18 in an electrolyte, for example, an $SO_2$ solution. There exists, in that case, a change in the E. M. F. when an alternating current is applied. Furthermore, instead of selenium cells, cells of other materials may be used, in so far as the specific direct current resistance of these other materials is altered by the passage of an alternating current or a current of a periodic nature.

By the above discovery, therefore, a simple and sensitive method is made possible for the detection and measurement of alternating currents (both ordinary alternating currents and currents of periodic nature, caused by the oscillations of wireless telegraphy).

Selenium cells can have, for this purpose, a much simpler form than that now in use for other purposes. Since the cells need not to be constructed for exposure to light, they can be built advantageously, as shown in Fig. 7, in condenser-form, i. e. between two (e. g. plane) electrodes 22, 23 of a material impermeable for electromagnetic waves of all kinds symmetrically arranged, a thin layer of selenium 24 may be spread. The electrodes 22, 23 will be impermeable to electro-magnetic waves when made of a material having an atomic weight of not less than fifty, for example platinum, nickel, iron, &c., and of sufficient thickness. That is to say, all electro-magnetic waves will enter or penetrate the metal to a certain depth, dependent upon the characteristics of the metal used, it being sufficient to avoid the influence of these waves by making the electrodes thicker than the depth of penetration of the waves. With metals having an atomic weight of less than fifty the penetration is too deep for practical purposes. When the waves fall upon a thick metal conductor they only penetrate a short distance, being mainly reflected, but when the electrode is of sheet metal and thin, the waves will pass through it. Such a cell has already been used by Uljanin (conf. Ries, page 107). While, however, formerly the electrodes had to be made from transparent or (e. g. for Röntgen rays) from very thin metal plates, for the present purpose, even metal electrodes cast in paraffin 26 within molds 25, as shown in Fig. 7, may be used. In this way the manufacture is much simplified.

It is specially to be noted, that always only the change of the specific direct current resistance of selenium produces the effect according to the present invention and that the known influences by contact action, coherer action, influences of electromagnetic waves or effects caused by temperature changes are strictly avoided in our structure.

Contact action due to current or electromagnetic waves passing between a point of one material in loose contact with a surface of another material is not present by reason of the selenium being cast between the electrode plates, and for the same reason the coherer action is absent, as there is no loose pulverulent or granular material through which the current passes.

The temperature effect is also *nil*, by reason of large surfaces, and the currents are not restricted to flow through small cross sections that heat, by reason of carrying too great current.

What we claim is:

1. The method of detecting currents of an inconstant character, which consists in passing a constant current through a material whose resistance varies when an inconstant current passes therethrough, causing an inconstant current also to pass through said material, eliminating any rectifying effect due to said material and any influence of electro-magnetic waves, and indicating the change of resistance due to the passage of said inconstant current.

2. A method for the detection and measurement of currents of a periodic nature, comprising supplying a constant direct current to selenium, superimposing a current of periodic nature and causing it to pass through said selenium, indicating the constant current change due to the variation of the selenium resistance, and eliminating from the selenium the influence of rectifying effect, contact action, coherer action, influences of electro-magnetic waves and temperature change effects.

3. Arrangement of apparatus for the detection of currents of inconstant character, consisting in the combination of a primary coil for the passage of the variable current, a secondary coil electromagnetically coupled to the primary coil, a circuit comprising said secondary coil, a source of direct current, a resistance of material changing its specific direct current resistance when a current of inconstant character passes through it and an apparatus for indicating the change of the direct current passing said resistance.

4. Arrangement of apparatus for the detection and measuring of currents of a periodic nature, consisting in the combination of a primary coil for the passage of the variable current, a secondary coil electromagnetically coupled to the primary coil, a circuit comprising said secondary coil, a source of direct current, a resistance of selenium and an apparatus for indicating the change of the direct current caused by the change of the specific resistance of selenium when a current of a periodic nature passes through it.

5. Arrangement of apparatus for the detection and measuring of currents of a periodic nature, consisting in the combination of a primary coil for the passage of the variable current, a secondary coil electromagnetically coupled to the primary coil, a circuit comprising said secondary coil, a source of direct current, a selenium cell in condenser-form having electrodes impermeable to electromagnetic waves of all kinds symmetrically arranged and a thin layer of selenium spread between them and an apparatus for indicating the change of the direct current caused by the change of the specific resistance of selenium when a current of a periodic nature passes through it.

6. Apparatus for detecting currents of inconstant character, comprising a Wheatstone bridge, a selenium cell inserted in one branch of said bridge adjacent the variable resistance branch thereof and means for supplying both direct constant current and inconstant current thereto.

7. Apparatus for detecting currents of inconstant character, comprising a Wheatstone bridge, a selenium cell included in each branch of said bridge adjacent the variable resistance thereof and means to supply a constant current and an inconstant current to said bridge.

In testimony that we claim the foregoing as our invention, we have signed our names in presence of two subscribing witnesses.

HEINRICH GREINACHER.
CARL W. MILLER.

Witnesses to signature of Carl W. Miller:
 HOWARD C. TORREY,
 H. CRAIG CROWELL.

Witnesses to signature of H. Greinacher:
 ARNOLD LEHNER,
 CARL GUBLER.